United States Patent [19]

Warseck

[11] Patent Number: 5,023,105

[45] Date of Patent: Jun. 11, 1991

[54] FOOD PRODUCTS CONTAINING NON-PUNGENT DIJON MUSTARD FLAVORING AND A PROCESS FOR MAKING MUSTARD PASTE

[75] Inventor: Michael R. Warseck, Randolph, N.J.

[73] Assignee: Nabisco Brands, Inc., East Hanover, N.J.

[21] Appl. No.: 366,745

[22] Filed: Jun. 15, 1989

[51] Int. Cl.$^5$ .................. A23L 1/221; A23L 1/225
[52] U.S. Cl. .................. 426/650; 426/638; 426/655; 426/425; 426/430; 426/431
[58] Field of Search ............ 426/650, 638, 655, 425, 426/430, 431

[56] References Cited

U.S. PATENT DOCUMENTS

| | | | |
|---|---|---|---|
| 3,044,876 | 7/1962 | Goering | 426/430 |
| 3,106,469 | 10/1963 | Mustakas et al. | 426/430 |
| 3,574,640 | 4/1971 | Dougherty, Jr. | 426/455 |
| 3,852,488 | 12/1974 | Yoda | 426/638 |
| 3,878,195 | 4/1975 | Taillie et al. | 260/212 |
| 4,062,979 | 12/1977 | Haak | 426/44 |

FOREIGN PATENT DOCUMENTS

| | | |
|---|---|---|
| 48-039472 | 6/1973 | Japan . |
| 48-040753 | 10/1973 | Japan . |
| 49-007229 | 2/1974 | Japan . |
| 54-014656 | 6/1979 | Japan . |
| 54-014657 | 6/1979 | Japan . |
| 58-060970 | 4/1983 | Japan . |
| 60016571 | 7/1983 | Japan . |
| 1286370 | 8/1972 | United Kingdom . |

*Primary Examiner*—Donald E. Czaja
*Assistant Examiner*—Evan Federman

[57] ABSTRACT

A non-pungent dijon mustard flavoring has been isolated as a water soluble extract of brown mustard seed bran. This non-pungent dijon mustard flavoring is useful in a variety of foods and, particularly, in mustard pastes containing yellow mustard seed, brown mustard seed, or mixtures thereof, because the addition of the extract to such mustard pastes increases their dijon flavor character without altering pungency. The extract can be isolated by contacting the brown mustard seed bran with water or an aqueous solution and separating the residual bran solids from the extract-containing water. The extract can then be blended with any food product in which a dijon flavoring is desirable. With respect to mustard paste, brown mustard seed bran can alternatively be mixed with the other conventional mustard ingredients (which include water) and ground to withdraw the water soluble bran extract.

25 Claims, 1 Drawing Sheet

FIG. 1
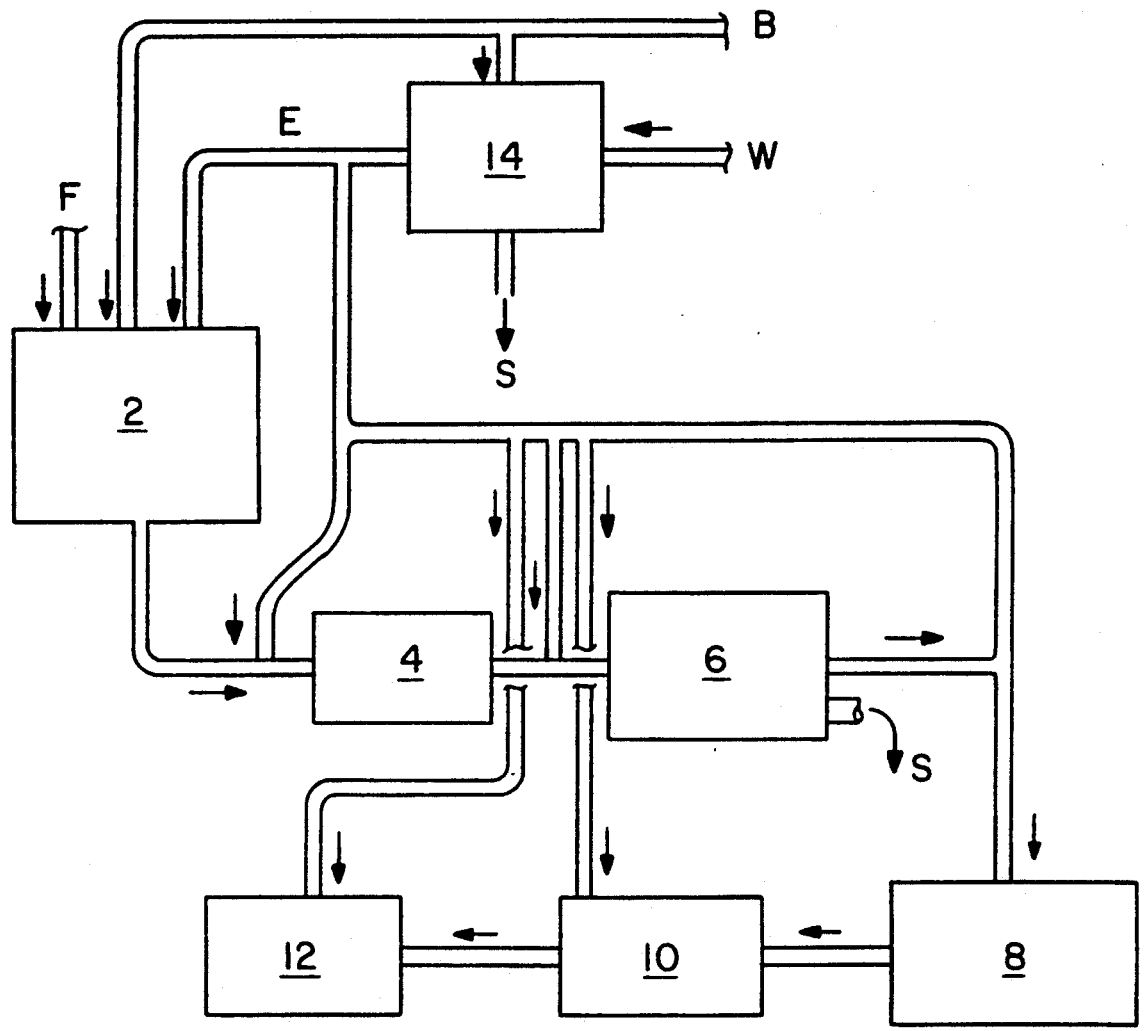
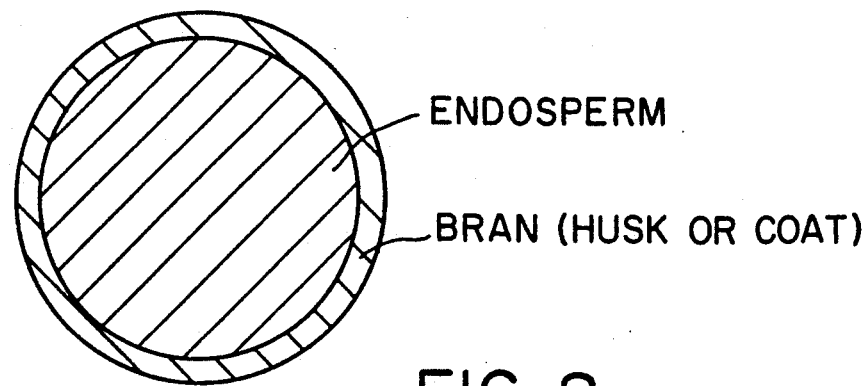
FIG. 2

FOOD PRODUCTS CONTAINING NON-PUNGENT DIJON MUSTARD FLAVORING AND A PROCESS FOR MAKING MUSTARD PASTE

BACKGROUND OF THE INVENTION

Condiment or prepared mustards (i.e., mustard pastes) generally fall into the classes of mild and pungent mustards.

Mild mustards, such as typical yellow mustards, are usually formulated with yellow, often called white, mustard seed (i.e., *Sinapis alba* a.k.a. *Brassica hirta*) and have no appreciable pungency. Although very fresh yellow mustard may exhibit some degree of pungency due to the presence of para-hydroxy benzyl isothiocyanate, it is a short-lived, transient effect. Yellow mustards are widely recognized and desired for their mild, non-pungent flavor. Typically, yellow mustards are prepared by mixing the ingredients which include water, vinegar, yellow mustard seed, salt, spices, and tumeric and then fully grinding these ingredients. In this process, the entire yellow mustard seed remains in the resulting mustard paste.

Pungent mustards utilize brown mustard seeds generically which are known to include: brown (i.e., *Brassica juncea*), oriental (i.e., yellow-coated *Brassica juncea*), and black (i.e., *Brassica nigra*) mustard seeds. Such mustards are known and valued for their nose-clearing, volatile "hotness" or pungency. Such mustards contain various levels of the volatile oil of mustard known as allyl isothiocyanate.

In some countries, such as France, dijon mustards cannot contain yellow mustard seed. However, in other countries, yellow mustard seed may be used in conjunction with brown mustard seed in dijon mustards to ameliorate the high pungency produced by the brown seed. It has also been attempted to utilize only yellow mustard seed in preparing a dijon mustard. Such products, however, tend to be of, at best, mediocre quality because the mustard is mild and has little if any dijon flavor character.

Dijon mustard is typically prepared by coarsely grinding mustard seed with water, vinegar, salt, and spices. Following such coarse grinding, the mustard seed bran is separated from the mustard paste by screening to produce a fine textured, pungent mustard with a distinctive dijon flavor. In country-type dijon mustards, the bran is not removed but remains in the mustard to impart a pleasant chunky, coarse appearance and country flavor.

SUMMARY OF THE INVENTION

It has been discovered that the water soluble extract of brown mustard seed bran isolated from seed endosperm is useful as a non-pungent dijon mustard flavoring. This extract is recovered by contacting brown mustard seed bran which has been separated from the seed endosperm with water or an aqueous solution, causing the extract (formed from water soluble materials) to be removed from the bran. The bran is then separated.

This flavoring is useful in a variety of foods, particularly mustard paste (i.e., mustard in condiment or prepared form). Such mustards can be prepared by either blending brown mustard seed bran extract at any conventional mustard-making stage or by adding the bran to the other mustard ingredients, optionally partially grinding them, and removing the residual bran particulates.

BRIEF DESCRIPTION OF THE DRAWINGS

FIG. 1 is a schematic flow diagram of the process of making mustard paste according to the present invention.

FIG. 2 is a cross-sectional view of a mustard seed.

DETAILED DESCRIPTION OF THE INVENTION

In essence, the present invention relates to a non-pungent, dijon mustard flavoring in the form of a water soluble extract of brown mustard seed bran which has been commercially isolated from seed endosperm. Brown mustard seed bran is intended to be the bran from *Brassica juncea* (brown or yellow-coated) or *Brassica nigra* mustard seed. When this flavoring is incorporated in foods, such foods are imparted with a dijon flavor character but not the usual pungency attendant to such flavors.

As shown in FIG. 2, mustard seeds typically have an inner endosperm region surrounded by an outer layer of bran. In manufacturing mustard powders for use as a spice, it is desired to remove the bran and then grind the endosperm into mustard powder. Conventionally, this separation is accomplished in a series of steps by first passing whole mustard seeds between the nip of a pair of rollers where the bran is cracked to loosen it from the endosperm. During this process, water is sprayed on the bran and endosperm in sufficient quantity to wet and soften the bran by absorption without appreciably wetting the endosperm. The rollers remove the bran, and the moist bran is then separated from the endosperm by sifting and blowing it away with air. The remaining endosperm is pulverized into mustard powder. Bran is thus a by-product of the conventional process of making mustard powder.

This dijon flavoring is useful in a variety of foods which require mustard-type flavorings. Such foods include: mustard paste (i.e., mustard in condiment form), salad dressing, mayonnaise, baked goods, dough, batter, glazes, gravies, soups, meat sauces, cooking sauces, and other condiments or food products.

Of the foods in which the non-pungent dijon mustard flavoring can be used, it is particularly useful in conjunction with mustard paste in condiment or prepared form. Brown mustard seed bran extract can be utilized in yellow mustard paste to impart a dijon flavor to the paste without making it pungent. Alternatively, the brown mustard seed bran extract of the present invention can be utilized in conjunction with mustard pastes formed from brown mustard seed to enhance the dijon flavor character of such products without significantly increasing pungency. As yet another alternative, the flavoring of the present invention can be utilized in conjunction with mustard pastes formed from both yellow and brown mustard seeds.

Such mustard pastes are produced by the process disclosed in the schematic flow diagram of FIG. 1. Generally, conventional mustard paste ingredients are added to batch tank 2 in the form of feed F for blending. These ingredients include, but are not limited to, water, vinegar, salt, spices, herbs, flavorants, vegetables, fruits., sweeteners (e.g., sugar or honey), juices, extracts, starches, flours, thickeners, and whole or crushed mustard seeds or fractions thereof. Once blended, the ingredients are conveyed to grinder 4 where the solid ingredients are reduced in size. The effluent of grinder 4 is then passed through screen 6 to remove spent brown mustard seed bran S. The material not retained by screen 6 is passed to a conventional deaerator 8 to remove air, thereby enabling additional mustard paste to be incorporated in a given package. Next, the deaerated mustard paste is optionally passed to holding or aging tank 10 where the mustard paste may be retained for 0 hours to two weeks. This step can, however, be deleted if the mustard paste will be immediately filled into a suitable container by filler 12. This equipment generally corresponds to that utilized in producing mustard paste from brown seeds.

The flavoring of the present invention can be incorporated into conventional mustard paste in either of two ways. In one alternative, the brown mustard seed bran B which has been isolated from seed endosperm is blended with the other ingredients of feed F in batch tank 2, passed to grinder 4, and then to screen 6 where the bran is removed. By virtue of the contact of bran B with the water in feed F, the water soluble flavoring extract of the present invention, having a non-pungent dijon character, is extracted. Alternatively, bran B is contacted with water or aqueous solution W in extractor 14 to produce a liquid mixture E of the water or aqueous solution and water soluble extract. If an aqueous solution is used as stream W for extraction, instead of pure water, such a solution can include some of the ingredients otherwise included in feed F. The spent bran S is simply withdrawn from extractor 14. Extractor 14 can be any conventional device used for contacting solids with fluids, such as static tank contactors or countercurrent or cocurrent extractors. As shown in FIG. 1, liquid mixture E can be added at any point in the process—e.g., to batch tank 2 alone or in admixture with the other ingredients in feed F, to grinder 4, to the feed to screen 6, to the feed to deaerator 8, to holding tank 10, or to filler 12. With any of these alternatives, the same water soluble materials extracted from the brown mustard seed bran are incorporated in the mustard paste product.

The operating conditions for extraction, whether in batch tank 2 or extractor 14, are the same. The extraction temperature is 33° F. to 210° F., preferably 55°-65° F., while the extraction pressure is 14.7 to 164.7 psia, preferably 14.7 psia. Extraction can alternatively be carried out under vacuum. Extraction can be accomplished in one minute to two days, preferably, in one to two hours.

In producing a pungent mustard using brown mustard seeds and having an enhanced dijon character through the use of the brown mustard seed extract of the present invention, grinder 4 reduces the ingredients to a coarse particle size of less than 1/16 of an inch and more than 7.5 thousandths of an inch (i.e., partial grinding), and screen 6 then removes spent bran S. Such partial grinding and screening is necessary, regardless of whether bran B is added directly to batch tank 2 or to extractor 14 with water soluble extract then being added to batch tank 2, because the whole brown mustard seed component of feed F must conventionally be subjected to such partial grinding and screening.

When producing a mustard paste with only yellow seeds and having the non-pungent dijon flavoring of the present invention, screening is necessary if the brown mustard seed bran B is added directly to batch tank 2. On the other hand, where bran B is added to extractor 14 to form a liquid mixture E of water (or aqueous solution) and water soluble extract which is then added to batch tank 2, grinder 4 can reduce the ingredients to a smaller particle size of less than or equal to 7.5 thousandths of an inch (i.e., total grinding) and screen 6 can be eliminated. This is typical of a conventional process of making a non-dijon character yellow mustard where yellow mustard seed is ground to a very small particle size and retained entirely in the resulting mustard paste. When the liquid mixture E of water (or aqueous solution) and brown mustard seed bran extract (but not bran solids) is added to batch tank 2, there is no need to deviate from conventional yellow mustard processing, because no brown mustard seed solids are added to the ingredients of feed F.

Where the non-pungent dijon mustard flavoring of the present invention is used in foods other than mustard paste, it can be isolated in a separate extractor like that designated as 14 in FIG. 1. Specifically, bran from brown mustard seed can be contacted with water to form a liquid mixture of water and water soluble bran extract. Once spent bran is removed, the liquid mixture can be used as is for flavoring or water can be removed by, for example, ultrafiltration, evaporation, freeze concentration, or freeze-drying to increase the extract concentration.

The key benefit of the extract of brown mustard seed bran from which endosperm has been isolated is this extract's non-pungent dijon flavor character. Although flavoring of this quality is beneficial in a variety of foods, it is particularly useful in conjunction with mustard pastes. Utilization of this extract in mild mustards formed solely from yellow mustard seed enables production of a previously unobtainable non-pungent yellow mustard with a dijon flavor character. The brown mustard seed bran extract of the present invention is also useful in conjunction with pungent mustards formed exclusively or at least partially from brown mustard seeds. In such mustards, the bran extract of the present invention increases the mustard's dijon character without changing pungency. The amount of brown mustard seed bran or bran extract utilized can, however, be proportioned to adjust pungency while keeping the dijon character of the mustard constant. The pungency and dijon flavor levels of brown mustard paste can thus be "engineered" to desired levels. Such "engineering" of mustard characteristics enables mustard to be produced at a certain pungency level which is known to be reduced by a certain degree over a certain period of time to produce a mustard which will have desired pungency when it reaches the consumer after a specified period.

EXAMPLES

EXAMPLE 1

A classic mild dijon style mustard can be made from the ingredients in Table 1.

TABLE 1

| Ingredient | % |
| --- | --- |
| Water | 50.00 |
| Yellow Mustard Seed | 20.00 |
| 120 Grain Distilled Vinegar | 12.00 |
| Salt | 6.00 |
| Oriental Mustard Bran | 6.00 |
| White Wine | 5.00 |
| Spices and Herbs | 1.00 |

These ingredients are mixed for 15 minutes, ground to the desired consistency, screened to remove the mustard bran, deaerated, and filled into containers.

EXAMPLE 2

A sweet champagne dijon style mustard can be made from the ingredients in Table 2.

TABLE 2

| Ingredient | % |
| --- | --- |
| Water | 9.75 |
| 120 Grain Distilled Vinegar | 15.00 |
| Yellow Mustard Flour | 25.00 |
| Oriental Mustard Bran Extract | 15.00 |
| Champagne | 20.00 |
| Sugar | 15.00 |
| Natural Flavor | 0.25 |

These ingredients are mixed for 15 minutes or until smooth and homogeneous and filled into suitable containers.

EXAMPLE 3

A slightly pungent honey mustard can be made from the ingredients in Table 3.

TABLE 3

| Ingredient | % |
| --- | --- |
| Water | 49.00 |
| 120 Grain Distilled Vinegar | 15.00 |
| Crushed Yellow Mustard Seed | 10.00 |
| Oriental Mustard Flour | 5.00 |
| Oriental Mustard Bran | 5.00 |
| Honey | 10.00 |
| Salt | 5.00 |
| Herbs | 1.00 |

These ingredients are mixed together for 20 minutes, screened to remove the mustard bran, deaerated, and filled into suitable containers.

EXAMPLE 4

The present invention can also be used to increase the true "dijon" flavor character of dijon style mustards that already have detectable and/or controlled amounts of pungency. Such a moderately pungent dijon style mustard can be made from the ingredients in Table 4 in the same manner as Example 3.

TABLE 4

| Ingredient | % |
| --- | --- |
| Water | 48.00 |
| 120 Grain Distilled Vinegar | 10.00 |
| Brown Mustard Seed | 10.00 |
| Yellow Mustard Seed | 10.00 |
| Salt | 6.00 |
| Oriental Mustard Bran | 5.00 |
| Wine | 10.00 |
| Spices | 1.00 |

Although the invention has been described in detail for the purpose of illustration, it is understood that such detail is solely for that purpose, and variations can be made therein by those skilled in the art without departing from the spirit and scope of the invention which is defined by the following claims.

I claim:

1. A food product containing mustard flavoring, wherein the improvement comprises incorporating an extract of brown mustard seed bran in said food product as all or part of the mustard flavoring, whereby said bran extract inparts a non-pungent, dijon mustard flavor to said food product.

2. A food product according to claim 1, wherein said food product is selected from the group consisting of mustard paste, salad dressing, mayonnaise, baked goods, dough, batter, glazes, gravies, soups, and sauces.

3. A food product according to claim 2, wherein said food product is mustard paste.

4. A food product according to claim 3, wherein the mustard paste comprises water, vinegar, mustard seed, and spices.

5. A food product according to claim 4, wherein the mustard paste further comprises sugar or honey.

6. A food product according to claim 3, wherein said mustard paste is formed from yellow mustard seed or fractions thereof and said bran extract imparts dijon flavor to said mustard paste.

7. A food product according to claim 3, wherein said mustard paste is formed from brown mustard seed or fractions thereof and said bran extract enhances the dijon flavor of said mustard paste.

8. A food product according to claim 7, wherein said mustard paste is additionally formed from yellow mustard seed or fractions thereof.

9. A food product according to claim 1, wherein said brown seed is selected from the group consisting of the following mustard seed types: brown, oriental, black, and mixtures thereof.

10. A food product according to claim 1, wherein said bran extract is water soluble.

11. A food product according to claim 2, wherein said mustard flavoring is formed from yellow mustard seed or fractions thereof and said bran extract imparts dijon flavor to said food product.

12. A food product according to claim 2, wherein said mustard flavoring is formed from brown mustard seed or fractions thereof and said bran extract enhances dijon flavor of said food product.

13. A food product according to claim 12, wherein said mustard paste is additionally formed from yellow mustard seed or fractions thereof.

14. A process of producing a dijon mustard comprising:
   mixing whole or crushed mustard seed or fractions thereof, water, vinegar, and spices to form a mustard seed blend;
   grinding the mustard seed blend to form a mustard paste; and
   adding a water soluble extract of brown mustard seed bran to either the mustard seed blend or to the mustard paste, wherein the extract imparts a non-pungent dijon flavor to the mustard paste.

15. A process according to claim 14, wherein said adding is carried out by blending brown mustard seed bran isolated from endosperm with the mustard seed blend, whereby said blending and said grinding cause the bran to contribute the extract to the mustard paste, said process further comprising:
   separating any residual bran particulates from the mustard paste after said grinding.

16. A process according to claim 14, wherein the bran extract is formed by mixing brown mustard seed bran isolated from endosperm with water or an aqueous solution which removes the extract from the bran, said process further comprising:
   separating the water or aqueous solution containing the bran extract from any residual bran particulates.

17. A process according to claim 14 further comprising:
deaerating the mustard paste after said grinding.

18. A process according to claim 17, wherein the bran extract is formed by mixing brown mustard seed bran isolated from endosperm with water or an aqueous solution which removes the extract from the bran, said process further comprising:
separating the water or aqueous solution containing the bran extract from any residual bran solids and
adding the water or aqueous solution containing the bran extract to the mustard paste during said deaerating.

19. A process according to claim 17 further comprising:
aging the mustard paste after said deaerating.

20. A process according to claim 14 further comprising:
aging the mustard paste after said grinding.

21. A process according to claim 20, wherein the bran extract is formed by mixing brown mustard seed bran isolated from endosperm with water or an aqueous solution which removes the extract from the bran, said process further comprising:
separating the water or aqueous solution containing the bran extract from any residual bran particulates and
adding the water or aqueous solution containing the bran extract to the mustard paste during said aging.

22. A process according to claim 14, wherein the mustard seed is brown mustard seed selected from the group consisting of the following mustard seed types: brown, oriental, black, and mixtures thereof.

23. A process according to claim 22 further comprising:
separating brown mustard seed bran from the mustard paste after grinding.

24. A process according to claim 14, wherein the mustard seed is yellow mustard seed or fractions thereof.

25. A process according to claim 14, wherein the mustard seed blend further comprises honey.

* * * * *